United States Patent [19]
Gibbons et al.

[11] Patent Number: 6,061,138
[45] Date of Patent: May 9, 2000

[54] OPTICAL EXPOSURE SYSTEMS AND PROCESSES FOR ALIGNMENT OF LIQUID CRYSTALS

[75] Inventors: Wayne M. Gibbons, Bear; Brian P. McGinnis, Newark, both of Del.

[73] Assignee: Elsicon, Inc., Wilmington, Del.

[21] Appl. No.: 08/906,300

[22] Filed: Aug. 5, 1997

[51] Int. Cl.[7] .................................................. G01B 11/00
[52] U.S. Cl. ............................................ 356/400; 356/401
[58] Field of Search .................................. 356/399, 400, 356/401

[56] References Cited

U.S. PATENT DOCUMENTS 4,974,941  12/1990  Gibbons et al. .
5,032,009   7/1991  Gibbons et al. .

FOREIGN PATENT DOCUMENTS 0742471  5/1996  European Pat. Off. .

*Primary Examiner*—Robert H. Kim
*Attorney, Agent, or Firm*—Huntley & Associates

[57] ABSTRACT

The invention relates to an optical exposure system with partial polarization and collimation components that is useful for exposing alignment layers with light in order to align liquid crystals. The exposure system comprises at least one source of optical radiation, means for partially collimating said optical radiation, means for partially polarizing said optical radiation and means for transporting the substrate and radiation relative to one another. Other embodiments further comprise means for partially filtering the optical radiation and means for some portion of said optical radiation to be incident at an oblique angle relative to said substrate. Other embodiments include processes for aligning liquid crystals using the optical exposure systems.

12 Claims, 6 Drawing Sheets

OPTICAL EXPOSURE SYSTEMS AND PROCESSES FOR ALIGNMENT OF LIQUID CRYSTALS

This invention was made with Government support under Agreement No. MDA972-93-2-0014 awarded by ARPA. The Government has certain rights in the invention.

BACKGROUND OF THE INVENTION

The present invention relates to optical exposure systems and optical processes for aligning optical alignment layers and liquid crystals with light.

Liquid crystal compounds are used in human and machine readable displays, finding applications in instrument controls, such as those in motor vehicles, avionics, medical devices, watches, portable computers, and desk top computer monitors. Common to each of these products is a liquid crystal layer disposed between a pair of substrates coated with a polymeric alignment layer. The polymeric alignment layer controls the direction of alignment of the liquid crystal medium in the absence of an electric field. Usually the direction of alignment of the liquid crystal medium is established in a mechanical buffing process wherein the polymer layer is buffed with a cloth or other fibrous material. The liquid crystal medium contacting the buffed surface typically aligns parallel to the mechanical buffing direction. Alternatively, an alignment layer comprising anisotropically absorbing molecules can be exposed to polarized light to align a liquid crystal medium as disclosed by Gibbons et al, in U.S. Pat. No. 5,032,009 and 4,974,941 "Process of Aligning and Realigning Liquid Crystal Media".

Most liquid crystal devices, including displays, have a finite pre-tilt angle, controlled, for instance, by the mechanical buffing of selected polymeric alignment layers. The liquid crystal molecules in contact with such a layer aligns parallel to the buffing direction, but is not exactly parallel to the substrate. The liquid crystal molecules are slightly tilted from the substrate, for instance by about 2–15 degrees. For optimum performance in most display applications a finite and uniform pre-tilt angle of the liquid crystal is desirable.

Recently a process for optical alignment with pre-tilt using polarized light has been described by Gibbons et al in U.S. pat. appl. Ser. No. 08/624,942 (filed Mar. 29, 1996). In that process, a material absorbs a source of radiation that is polarized. Several examples of various optical alignment layers are described in Gibbons et al. The layers are subsequently aligned at a specified angle with respect to the polarization and mediates the alignment of a liquid crystal in contact with the alignment layers. Pre-tilt of the liquid crystal can be achieved by controlling the angle of incidence of the ultraviolet radiation. This is most often achieved through multiple exposure steps.

Another process for using polarized light to expose an alignment material to orient liquid crystals with pre-tilt is described by Kobayashi et.al, in European Patent Application EP 0742471. Kobayashi, et.al., consider exposures of a substrate to linearly polarized light in two steps, the second step with polarized light containing components perpendicular to the first exposure step. The process also claims the use of unpolarized light as part of the process. Finally, Kobayashi, et.al., discuss the possibility of using elliptically polarized light as a more general description of linearly polarized light. In all discussions of said process, the angle of incidence of the light does not consider the divergence of the light and consequently treats only the case of collimated light. As such, any optical system used for exposure in said process is required to produce highly collimated and highly polarized light over the entire area of exposure.

There is a need for an optical exposure system that can deliver polarized light over large areas. There also is a need for an optical exposure system and processes for inducing pre-tilt in a liquid crystal medium in a single exposure step. To realize these objectives the inventors have found that the degree of polarization and collimation are parameters that can be adjusted in an optical exposure system and which play an important role in exposure processes. Until now, optical exposure systems for alignment materials have been designed to achieve both highly polarized and highly collimated radiation. It is now possible to control these requirements to appropriate levels and achieve improved performance and new exposure geometries.

An optical exposure system and processes that makes use of partial polarization and partial collimation of components is disclosed herein that has distinct advantages over systems that are fully polarized and fully collimated. The optical exposure system is useful as production level optical exposure system.

SUMMARY OF THE INVENTION

It is an object of this invention to provide an efficient optical exposure system capable of illuminating large area substrates with partially polarized and partially collimated UV light. A further object of this invention is a process using partially collimated and partially polarized light to optically align optical alignment layers and, subsequently, liquid crystals placed in contact with the optical alignment layers. Another aspect of this invention is a process for inducing alignment with pre-tilt of liquid crystals with only a single exposure step. It is a further object of this invention to demonstrate that large substrate areas can be exposed by combining multiple smaller components whose composite performs the same function of the smaller component over a larger area One embodiment of the invention is an optical exposure system for aligning a substrate with partially polarized and partially collimated light comprising at least one source of optical radiation, means for partially collimating said optical radiation, means for partially polarizing said optical radiation and means for transporting the substrate and radiation relative to one another. Other embodiments further comprise means for partially filtering the optical radiation and means for some portion of said optical radiation to be incident at an oblique angle relative to said substrate. Other embodiments include processes for aligning liquid crystals using the optical exposure systems.

DETAILED DESCRIPTION OF THE INVENTION

The terms "optical alignment layer" as referred to herein means any layer that can have its dielectric properties anisotropically changed when exposed to optical radiation. Some examples of optical alignment layers are disclosed in Gibbons, et.al. noted above, Schadt, et al, in U.S. Pat. No. 5,567,349 and Chigrinov, et al, in U.S. Pat. No. 5,389,698.

The term "substrate" as referred to herein means any material that is an optical alignment layer or has an optical alignment layer adhered to it.

The term "unpolarized light" as referred to herein means optical radiation with a randomly varying instantaneous state of polarization with an average uniform distribution about the axis of propagation.

The term "partially polarized light" as referred to herein means optical radiation with a randomly varying instantaneous state of polarization with a distribution along two principal orthogonal axes such that a one axis contains an average higher intensity than the orthogonal axis. The orthogonal axes of partially polarized light range in relative intensity from 1:100 to 100:1 excluding the states of about 1:1, which is unpolarized light as defined above. Preferred partially polarized light ranges in relative intensity from about 2:1 to about 30:1 and from about 1:2 to about 1:30.

The use of partially polarized light in the instant invention differs from the process discussed by Kobayashi, et.al, in that the polarization state of the light is not defined by either linear or elliptical polarization. Partially polarized light is easier to produce using sources of incoherent light than either linear or elliptical polarization. This relates to the random nature of sources of incoherent light. Sources of incoherent light include lamps, such as arc lamps and other gas-filled lamps commonly used in most exposure systems. Production of linear or elliptical polarization from such incoherent sources is difficult and is further complicated as the area of exposure is increased. The instant invention makes use of partially polarized light, which is easier to produce from incoherent sources considering the range of ray angles and dimensions that such sources cover. The use of partially polarized light to align a substrate can lead to increases in throughput and more effective use of optical radiation.

Any device that produces unpolarized light in the wavelength range of 150 nm to 2000 nm is a source of optical radiation. Examples of useful sources include, but are not limited to, arc lamps, incandescent lamps, lasers, and gas-filled lamps. A preferred source is a linear gas-filled lamp of high brightness. Other preferred sources include ones based on gas-filled lamps that are excited by microwaves (for example, those provided by Fusion UV Systems, Inc., Gaithersburg, Md.). The microwave excitation provides for additional control of the spectral properties of the lamp. Some examples of lamps (both arc and microwave-excited) are mercury and the excimer bulbs (e.g., xenon chloride and cobalt).

The term "partially collimated" as referred to herein means light with a divergence of greater than about 5 degrees along at least one dimension. The collimation of light may be different along different directions. A preferred optical system produces partially collimated light with a divergence of greater than about 5 degrees and less than about 30 degrees along one dimension and an unlimited divergence along the orthogonal dimension. Partial collimation can be accomplished by, but is not limited to, an arrangement of mirrors, refractive optics (e.g., lenses) and apertures. Preferred means for partially collimating the optical radiation are selected from the group of curved reflector, aperture, vane and refractive optic. A preferred collimator for this invention consists of at least one curved mirror and at least one aperture. Another preferred collimator consists of a cylindrical elliptical mirror and at least one aperture matched to the dimensions of the linear lamp. In this embodiment, a portion of the elliptical mirror produces rays of some limited divergence, less than 45 degrees, which are further limited by at least one aperture in a plane orthogonal to the cylindrical axis. In the plane parallel to the cylindrical axis, rays are unaffected.

Figure 5:
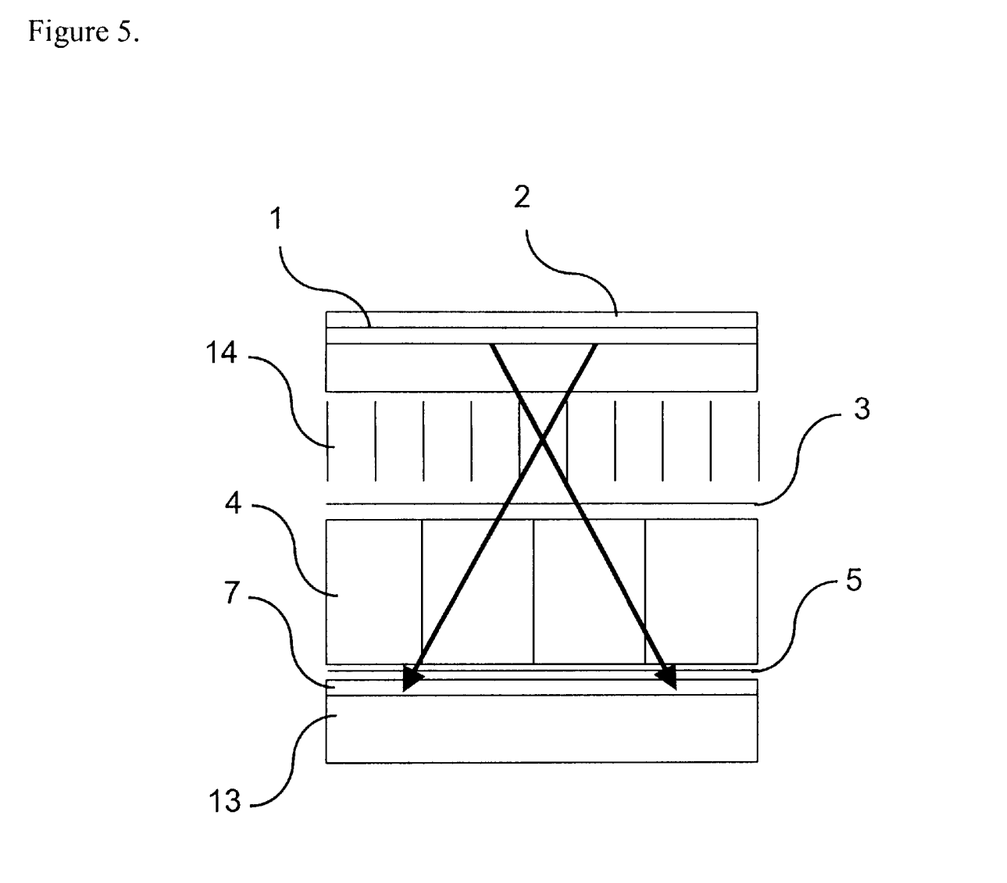
FIG. 5 illustrates a front view of an optical system utilizing a vane structure to control the degree of partial collimation.

Another preferred collimator is a vane structure. A "vane structure" means equipment to partially collimate light. It acts as an aperture for rays of light propagating at an angle to the optical axis of the structure. It may partially collimate the light in one or two dimensions. An example of a one dimensional vane structure is an array of at least two thin flat absorbing surfaces aligned so the faces of the surfaces are parallel to each other and perpendicular to the desired optical axis of the light. Rays at an angle to the optical axis can be partially absorbed by the vane. The maximum angle is determined by he separation and the length of the surfaces comprising the vane. An example of a two dimensional vane structure is a honeycomb of partially absorbing surfaces. Rays propagating parallel to the length of the honeycomb are transmitted and define the optic axis. Rays at an angle to the optic axis can be absorbed. The maximum angle is determined by the size of the honeycomb and the length of the honeycomb comprising the vane. A one dimensional vane is illustrated in FIG. 5 and further described in Example 8.

The degree of collimation may be different for different directions. If the collimation of a light source is only controlled in one dimension, then the other dimension may be increased indefinitely. For example, a linear lamp may be relatively well collimated by a cylindrical optic in one dimension. The orthogonal dimension is unaffected. The length then may be increased to any desired exposure width. When combined with linear scanning of the substrate, a very large area can be uniformly exposed. In multiple exposure systems, the degree of collimation may be different for some or all of the exposures.

The use of partially collimated light of the instant invention has not been considered before. A high degree of collimation of the light source has been assumed to be a requirement to achieve good alignment in optical alignment layers. The instant invention shows examples of good and uniform alignment using a source that has been partially collimated. The combination of partial collimation and partial polarization leads to an exposure process capable of illuminating very large areas. This is particularly true when the substrate being exposed is scanned under the exposure area Scanning has the further advantage of averaging the exposure along the direction of travel and generating very uniform exposure. Another aspect of using partially collimated light relates to uniformity of exposure. A low degree of collimation in the dimension perpendicular to the scan direction generates a more diffuse illumination along that dimension that minimizes irregularities in the exposure uniformity due to defects in the optical components. This particularly relates to components comprised of arrays of elements. For example, a thin film polarizer comprised of a linear array of smaller polarizers in contact along their edges would suffer from nonuniform exposure due to the edge seams if used in collimated light. Partially collimated light diffuses the image of the seams and results in much more uniform illumination.

A partial polarizer converts unpolarized light to partially polarized light, or converts polarized light to partially polarized light. Examples of partial polarizers include, but are not limited to, thin film polarizers, polarization beam splitters, one or more plates at Brewster's angle, anisotropic absorbing media, reflective surfaces and scattering media. A preferred partial polarizer for this invention is a thin film polarizer operated near its design angle. The reflected rays from a thin film polarizer are not as strongly polarized as the transmitted rays. Rays incident at an angle not at the design angle are less polarized than those at the design angle. The sum of rays from an extended partially collimated source is only partially polarized in either reflection or transmission. For a given thin film polarizer design, the degree of polarization can be adjusted through a finite range by varying the average incident angle or by varying the divergence of the incident rays. Optical elements that generate partially polarized optical radiation may be used alone or in combination to achieve the desired degree of polarization. In multiple exposure systems, the degree of polarization may be different for some or all or the exposures.

The optical radiation incident upon the substrate can have its spectral content limited by spectral filters. Examples of filters include, but are not limited to, dichroic thin film dielectric reflectors, absorbing glasses, absorbing dyes, prisms, gratings and Bragg reflectors. The filtration may be intrinsic or included as part of the optical source. A preferred filter is a dichroic thin film reflector on a transparent substrate. Another preferred filter is an absorbing glass. Furthermore, the partial filtering of the optical radiation can be performed by the other optical components in the system. For example, the polarizer and reflecting or transmitting optics often will reflect, transmit, and/or absorb optical radiation depending on its spectral content. Thus, one may not be required to insert additional means of filtering into an optical exposure system if these other components inherently filter out undesired wavelength components.

The optical system of the instant invention delivers the optical radiation at a specified angle with respect to the normal of the substrate surface. An example is exposing a substrate with the reflected radiation from a thin film polarizer wherein the polarizer surface is at an oblique angle to the substrate surface. Another example is exposing a substrate with the reflected radiation from a mirror wherein the mirror surface is at an oblique angle to the substrate surface. A preferred angle of incidence is 45 degrees±10 degrees.

A means to transport the substrate relative to the optical radiation allows the exposure area to be smaller than the substrate dimension. A complete scan will uniformly expose the substrate. An example is a linear translation stage that supports the substrate and travels at a constant velocity with respect to the optical subsystem comprised of a linear lamp. An aspect of scanning the substrate relates to uniform exposure. Nonuniform light illumination parallel to the direction of the scan is averaged along that dimension leading to uniform exposure. Since an aspect of this invention allows partially collimated and partially polarized light, these properties are not expected to always remain constant across the illuminated area of the substrate. Scanning averages these nonuniform properties along the scan direction and achieves uniform exposure. Another advantage of this approach is that it is compatible with continuous motion assembly lines.

To generate large area exposures, large area sources, polarizers, collimation optics (e.g., lenses, curved mirrors) and optics for re-directing the light (e.g., flat mirrors) are required. One aspect of this invention is that smaller components can be combined into an array to make these large area components. For example, by taking 4 smaller 3"×4" thin film polarizers, a large polarizer of 12"×4" is made. Thus, a 12" substrate can be exposed using the smaller component polarizers. Similar arguments can be made for the sources, collimation optics, and optics for re-directing the light.

Some embodiments of the invention require that two or more exposures be performed to generate alignment and pretilt. For example, this is desirable in cases where the polarization ratio for a single exposure system is not adequate. In this case, the optical system is comprised of multiple optical exposure systems to generate alignment and pretilt. For example, substrates coated with optical alignment materials are first exposed with partially polarized and partially collimated light at near normal incidence to generate the alignment direction. This is followed by an exposure of partially collimated and partially polarized light at oblique incidence to generate the pretilt.

It is often needed that the polarization state of the exposure systems and/or the optical energies of the exposure systems be different, and/or the substrates be rotated relative to the incident optical radiation of each subsequent exposure. In this case the exposures are performed in parallel by overlapping the output of the various optical exposure systems or they are done serially by having one exposure follow another in time and/or space. A preferred embodiment uses a common transport mechanism for all the optical exposure systems that translates the substrate under the multiple outputs from the optical exposure systems.

An ability to rotate the substrate in any direction is used to change the orientation of the polarization and/or direction of optical radiation propagation relative to the substrate. A preferred direction of rotation is about an axis in the plane of the substrate (polar direction). Another preferred direction of rotation is about the normal to the substrate (azimuthal direction). Another preferred direction of rotation is a combination of polar and azimuthal rotations. This process is useful for generating alignment and pretilt when multiple exposures are required.

Figure 1:
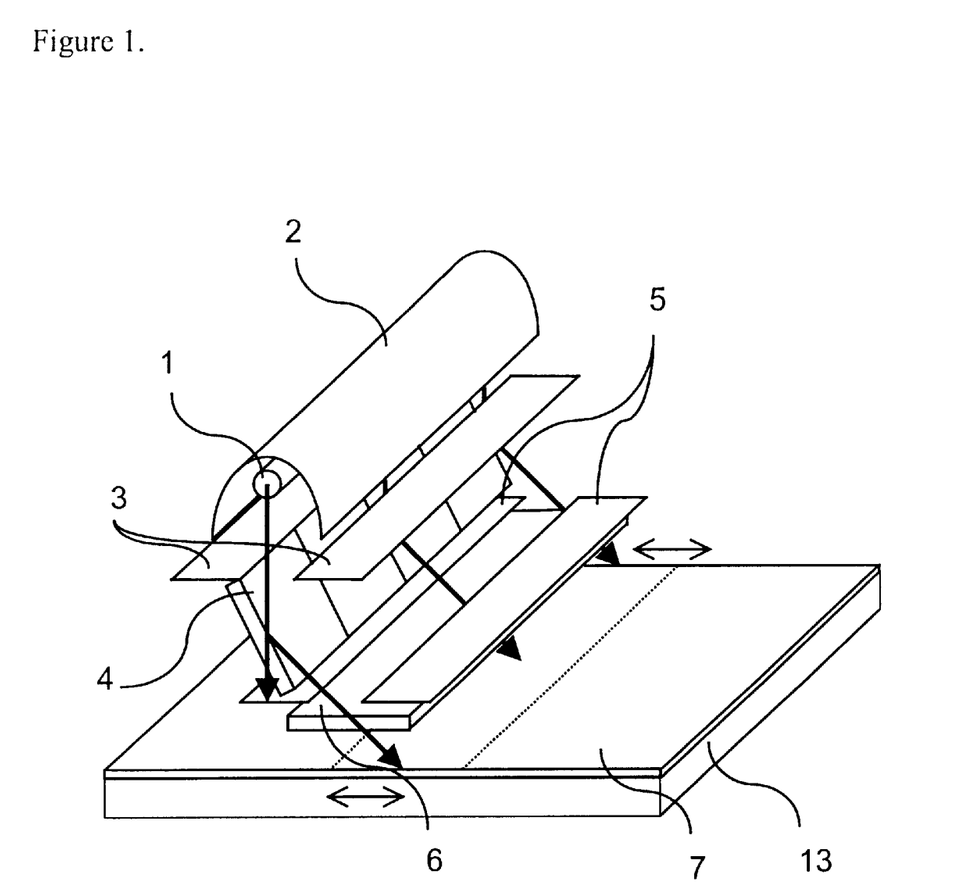
FIG. 1 illustrates an optical exposure system with partially collimated and partially polarized radiation.

A preferred optical exposure system for aligning a substrate with partially polarized and partially collimated light comprises: at least one source of optical radiation having a long axis; a means for partially collimating and partially polarizing said optical radiation comprising: a cylindrical elliptical mirror with a long axis, located parallel to the long axis of the source and at a distance to focus the optical radiation at a focus point; a first aperture with a long axis and faces toward and away from the source, located at about the focus point and along the long axis of the source; a thin film polarizer with faces toward and away from the source and a specified design angle, located along the face of the first aperture away from the source and at an angle corresponding to the specified design angle, wherein the thin film polarizer generates a reflected ray and a transmited ray; a second aperture with a long axis and faces toward and away from the source, located along the face of the thin film polarizer away from the source, along the long axis of the first aperture, and parallel to the first aperture; a means for partially filtering said optical radiation is a filter with faces toward and away from the source, located parallel and along the face of the second aperture away from the source; a means for transporting the substrate relative to the partially collimated and partially polarized optical radiation is a translation stage with a surface facing the source, for holding the substrate, located parallel and along the face of the filter away from the source. Such a system is illustrated in FIG. 1 and further explained in the examples.

Figure 3:
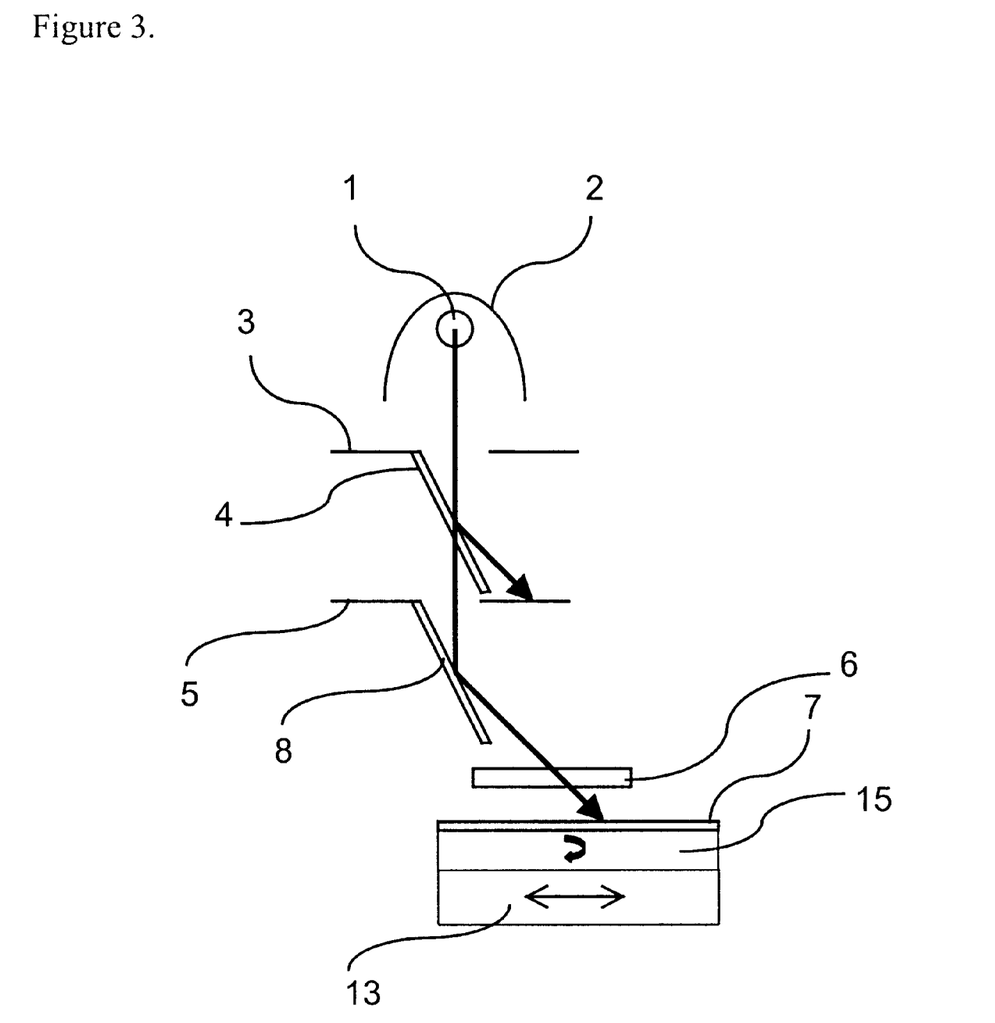
FIG. 3 illustrates a side view of an optical system used for exposure of a substrate at oblique incidence.

Another preferred optical exposure system includes a reflecting mirror with a reflecting surface facing the source, located between the second aperture and the filter, in position to reflect the transmitted ray of the thin film polarizer onto the substrate to create an angle of incidence of the transmitted ray on the substrate. Such a system is illustrated in FIG. 3 and further explained in the examples.

Another embodiment is a process for aligning an optical alignment layer comprising exposing an optical alignment layer to partially polarized light, wherein the partially polarized light is absorbed by said alignment layer and the exposed alignment layer has anisotropic dielectric properties. Preferred is a process wherein the partially polarized light is also partially collimated.

Figure 6:
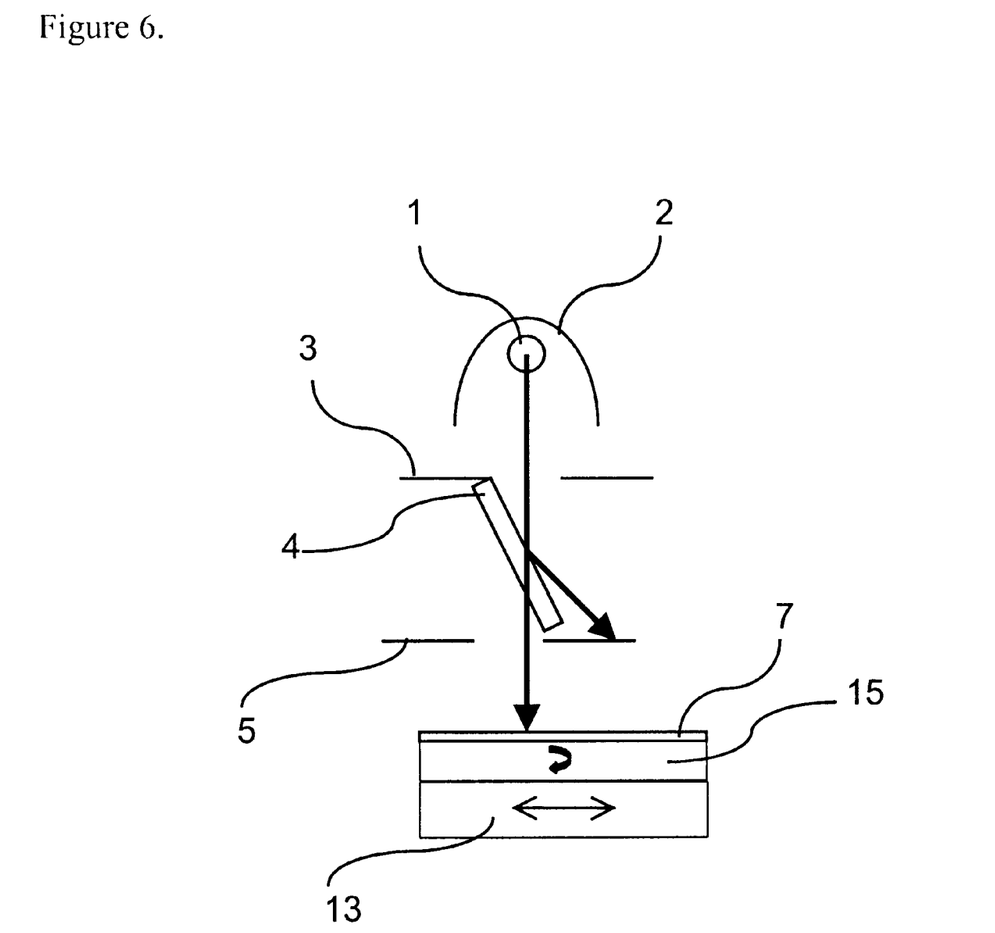
FIG. 6 illustrates a side view of an optical system used for exposure of a substrate at near normal incidence.

Another embodiment of the present invention is illustrated in FIG. 6. In that Figure, a linear gas filled lamp 1 and a cylindrical elliptical mirror 2 are positioned to direct partially polarized light through plate 3 having an aperture formed therein. The light directed is through thin film polarizer 4 located at its design angel of 68 degrees below the aperture. The rays transmitted through the polarizer pasts through an aperture formed in a second plate 5 to impinge on substrates 7, with photoresponsive polyimide alignment layers positioned on a linear translation stage 13. A mechanical stage 15 is interposed between the linear translation stage 13 and substrate 7.

A further embodiment is a process for generating alignment of liquid crystal medium adjacent to a surface of an optical alignment layer comprising exposing an optical alignment layer to partially polarized light, the partially polarized light being absorbed by said alignment layer and applying the liquid crystal medium to the optical alignment layer, wherein the exposed alignment layer induces alignment of the liquid crystal. A preferred process is wherein the partially polarized light is also partially collimated. Other preferred processes include a step wherein the liquid crystal medium, once contacting the optical alignment layer, is heated above the liquid crystal medium's isotropic point and cooled below its isotropic point. Other preferred processes include exposing an optical alignment layer to partially polarized light is at oblique incidence and the exposed alignment layer induces a pre-tilt angle of said liquid crystal medium with respect to the surface of the optical alignment layer. Other preferred processes include exposing an optical alignment layer comprising two exposures to partially polarized light wherein there is an angle greater than 0 degrees but less than 360 degrees of relative rotation about the normal to the surface of the optical alignment layer between the two exposures. These processes are exemplified in the following examples.

EXAMPLE 1

This example illustrates an optical exposure system of the invention that uses partially polarized light to optically align liquid crystals with pretilt with a single exposure.

The optical exposure system is shown in FIG. 1. The source of optical radiation was an ultraviolet light, a 10" linear gas-filled lamp 1 excited by a microwave source (from Fusion UV Systems, Inc., Gaithersburg, Md.). The optical radiation was collected by a cylindrical elliptical mirror 2. A first aperture 3 of 1.5"×10" was located near the focus of the lamp. A thin film polarizer 4 of 4"×12", comprised of a linear array of four 4"×3" thin film polarizers (CVI, Albuquerque, N.M.), was located at its design angle of 68 degrees after the aperture. The rays reflected from the polarizer were passed through a second aperture 5 of 1.5"×8" located after the polarizer. The cylindrical reflector and two apertures created partially collimated light that had a divergence of approximately 10–15 degrees in the dimension along the scan direction and had little effect on the divergence of the lamp in the direction perpendicular to the scan direction (approximately 30–45 degrees). An absorbing glass plate 6 blocked transmission of radiation with wavelengths shorter than 270 nm. Substrates (coated with optical alignment layers) 7 were scanned along an axis orthogonal to the long axis of the lamp at a constant velocity with a linear translation stage 13 (Aerotech, Pittsburgh, Pa.). The light passing through the second aperture was nominally incident at 44 degrees upon the substrates. The polarization ratio of light polarized parallel to the scan direction to light polarized orthogonal to the scan direction was measured to be nominally 1:2 after integration across the full aperture parallel to the scan direction.

Using the above optical exposure system, substrates with a photosensitive polyimide were exposed at a total energy density of about 100 Joules/cm$^2$. The scan speed and power of the lamp were chosen to give the desired energy density to sufficiently expose the optical alignment material on the substrates and cause the alignment of liquid crystal placed in contact with the alignment material.

After exposure, the substrates were assembled with orthogonal orientation of the optically generated alignment direction. The cell thickness was about 4 microns. The cell was subsequently capillary filled with nematic liquid crystals. As expected, the liquid crystals were observed to align in a twisted nematic orientation with pretilt. Upon heating the liquid crystal cell above the liquid crystal isotropic point (95 degrees C. for 30 minutes), the uniformity of the alignment was observed to improve. The pretilt was verified by using the crystal rotation method of Baur et. al. (Physics Letters, Vol. 56A, Mar. 8, 1976).

EXAMPLE 2

This example illustrated an optical exposure system that uses partially polarized light to generate optical alignment with no pre-tilt.

Figure 2:
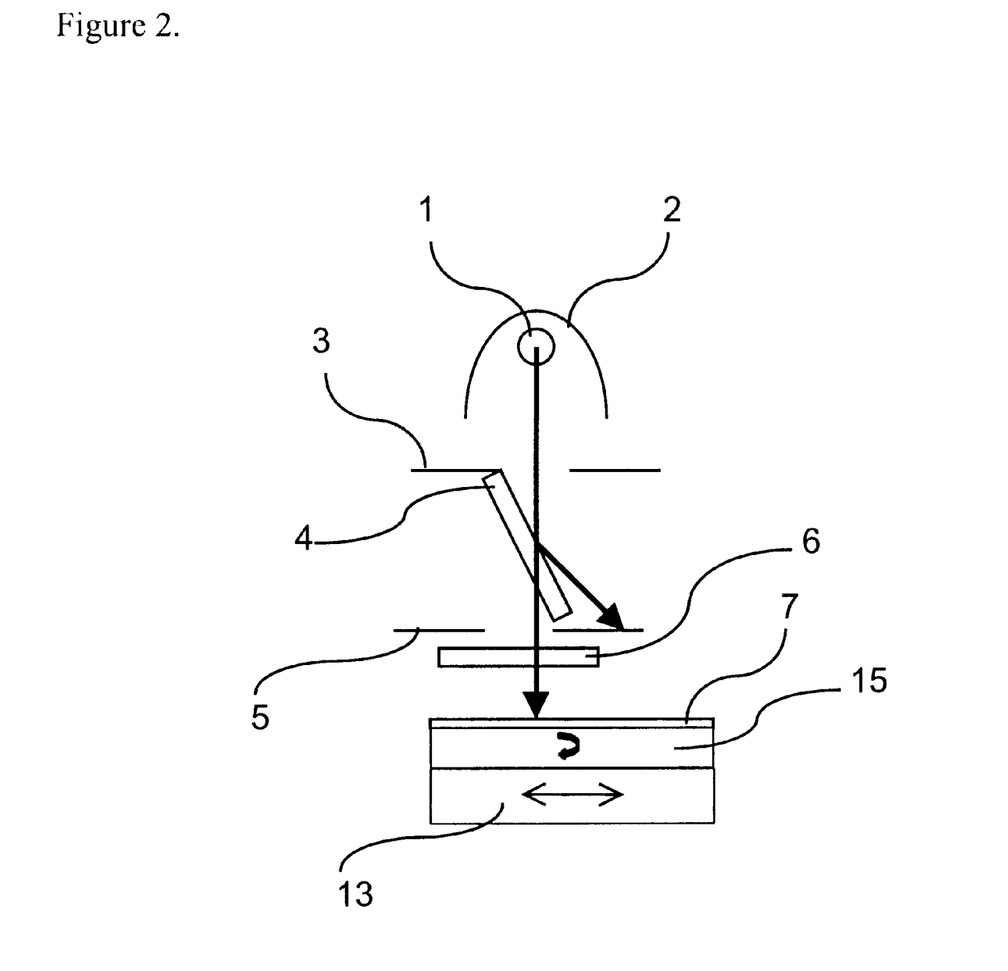
FIG. 2 illustrates a side view of an optical system used for exposure of a substrate at near normal incidence.

The optical exposure system of this example is shown in FIG. 2. The lamp system comprising a linear gas filled lamp 1 and a cylindrical eliptical mirror 2 of Example 1 were combined with a first aperture 3 of 1.5"×10" which was located near the focus of the lamp. The thin film polarizer 4 of Example 1 was located at its design angle (68 degrees) after the aperture. The rays transmitted through the polarizer were passed through a second aperture 5 of 1.5"×8" placed after the polarizer. The cylindrical reflector and two apertures created partially collimated light that had a divergence of approximately 10–15 degrees in the dimension along the scan direction and had little effect on the divergence of the lamp in the direction perpendicular to the scan direction (approximately 30–45 degrees). An absorbing glass plate 6 blocked transmission of radiation with wavelengths shorter than 270 nm. Substrates 7, with photoresponsive polyimide alignment layers, were scanned along an axis orthogonal to the long axis of the lamp at a constant velocity with a linear translation stage 13. The light passing through the second aperture was nominally incident normal to the substrate. The polarization ratio of light polarized parallel to the scan direction to light polarized orthogonal to the scan direction was measured to be approximately 8:1 after integration across the full aperture parallel to the scan direction.

Using the above optical exposure system, substrates with a photosensitive polyimide were exposed at a total energy density of about 100 Joules/cm$^2$. The scan speed and power of the lamp were chosen to give the desired energy density to sufficiently expose the optical alignment material on the substrates and cause the alignment of liquid crystal placed in contact with the alignment material.

After exposure, the substrates were assembled with orthogonal orientation of the optically generated alignment direction. The cell thickness was about 4 microns. The cell was subsequently capillary filled with nematic liquid crystals. Upon heating the liquid crystal cell above the liquid crystal isotropic point (95 degrees C. for 30 minutes), the uniformity of the alignment was observed to improve. As expected, the liquid crystals were observed to align in a twisted nematic orientation with no pretilt.

EXAMPLE 3

This example illustrates an optical exposure system of Example 2 combined with an optical exposure system of FIG. 3 for exposure at oblique incidence. This dual exposure process is used to optically align liquid crystals with pretilt and illustrates the polarizing effect of a mirror to increase the polarization ratio.

Substrates, with photosensitive polyimide alignment layers, were exposed first by the system detailed in Example 2. The substrates were then rotated 90 degrees about the normal to the plane of the substrates with a mechanical stage 15. The substrates were then exposed a second time by the optical exposure system in FIG. 3. The lamp system (1 and 2) of Example 1 were combined with a first aperture 3 of 1.5"×10" which was placed near the focus of the lamp. The cylindrical reflector and two apertures created partially collimated light that had a divergence of approximately 10–15 degrees in the dimension along the scan direction and had little effect on the divergence of the lamp in the direction perpendicular to the scan direction (approximately 30–45 degrees). The thin film polarizer 4 of Example 1 was placed at its design angle (68 degrees) after the aperture. The rays transmitted through the polarizer were passed through a second aperture 5 of 1.5"×8" placed after the polarizer. A mirror 8 (Fusion Systems, Gaithersburg, Md.) consisting of an aluminum-coated aluminum substrate was placed after the second aperture at an oblique angle of 68 degrees. The mirror also acted to increase the polarization ratio of the optical radiation at this angle to approximately 11:1. The substrates 7 were scanned along an axis orthogonal to the long axis of the lamp at a constant velocity with a linear translation stage 13. The light reflecting from the mirror 8 was nominally incident at 44 degrees upon the coated substrates.

Using the above optical exposure systems, substrates with a photosensitive polyimide were exposed at a total energy density of about 100 Joules/cm$^2$. The relative ratio of exposure energies was 4:1 between the first and second exposures. The scan speeds and power of the lamp were chosen to give the desired energy density to sufficiently expose the optical alignment material on the substrates and cause the alignment of liquid crystal placed in contact with the alignment material.

After exposure, the substrates were assembled with orthogonal orientation of the optically generated alignment direction. The cell thickness was about 4 microns. The cell was subsequently capillary filled with nematic liquid crystals. As expected, the liquid crystals were observed to align in a twisted nematic orientation with pretilt. Upon heating the liquid crystal cell above the liquid crystal isotropic point (95 degrees C. for 30 minutes), the uniformity of the alignment was observed to improve. The pretilt was verified by using the crystal rotation method.

EXAMPLE 4

This example illustrates how an optical exposure system of Example 2 was combined with that of FIG. 3 to optically align liquid crystals with pretilt.

Example 3 was repeated except that the first exposure was with the optical exposure system of FIG. 3 and the second exposure was with the optical exposure system of FIG. 2.

The relative ratio of exposing energies was 1:4 between the first and second exposures. After exposure, the substrates were assembled with orthogonal orientation of the optically generated alignment direction. The cell thickness was on the order of 4 microns. The cell was subsequently capillary filled with nematic liquid crystals. As expected, the liquid crystals were observed to align in a twisted nematic orientation with pretilt. Upon heating the liquid crystal cell above the liquid crystal isotropic point (95 degrees C. for 30 minutes), the uniformity of the alignment was observed to improve. The pretilt was verified by using the crystal rotation method.

EXAMPLE 5

This example illustrates an optical exposure system using two exposures at oblique incidence that generated optical alignment with pre-tilt.

Substrates with a photosensitive polyimide alignment layer were exposed first by the system detailed in FIG. 3. The substrates were then rotated 90 degrees about the normal to the plane of the substrates with a mechanical stage 15. The substrate was then exposed a second time by the same system. . The total exposure energy density was about 100 Joules/cm$^2$. The relative ratio of exposing energies was 4:1 between the first and second exposures. After exposure, substrates were assembled with orthogonal orientation of the optically generated alignment direction. The cell thickness was about 4 microns. The cell was subsequently capillary filled with nematic liquid crystals. As expected, the liquid crystals were observed to align in a twisted nematic orientation with pretilt. Upon heating the liquid crystal cell above the liquid crystal isotropic point (95 degrees C. for 30 minutes), the uniformity of the alignment was observed to improve. The pretilt was verified by using the crystal rotation method.

EXAMPLE 6

This example illustrates an optical exposure system that generated optical alignment with pre-tilt using two exposures at oblique incidence.

Substrates with a photosensitive polyimide alignment layer were exposed first by the system detailed in FIG. 3. The substrates were then rotated 90 degrees about the normal to the plane of the substrates with a mechanical stage 15. The substrates were then exposed a second time by the same said system. The relative ratio of exposing energies was 1:4 between the first and second exposures. The total dual exposure energy density was about 100 Joules/cm$^2$. After exposure, the substrates were assembled with orthogonal orientation of the optically generated alignment direction. The cell thickness was about 4 microns. The cell was subsequently capillary filled with nematic liquid crystals. As expected, the liquid crystals were observed to align in a twisted nematic orientation with pretilt. Upon heating the liquid crystal cell above the liquid crystal isotropic point (95 degrees C. for 30 minutes), the uniformity of the alignment was observed to improve. The pretilt was verified by using the crystal rotation method.

EXAMPLE 7

This example demonstrates that optical exposure equipment of this invention can be used to change the dielectric properties of exposed optical alignment layers.

Figure 4:
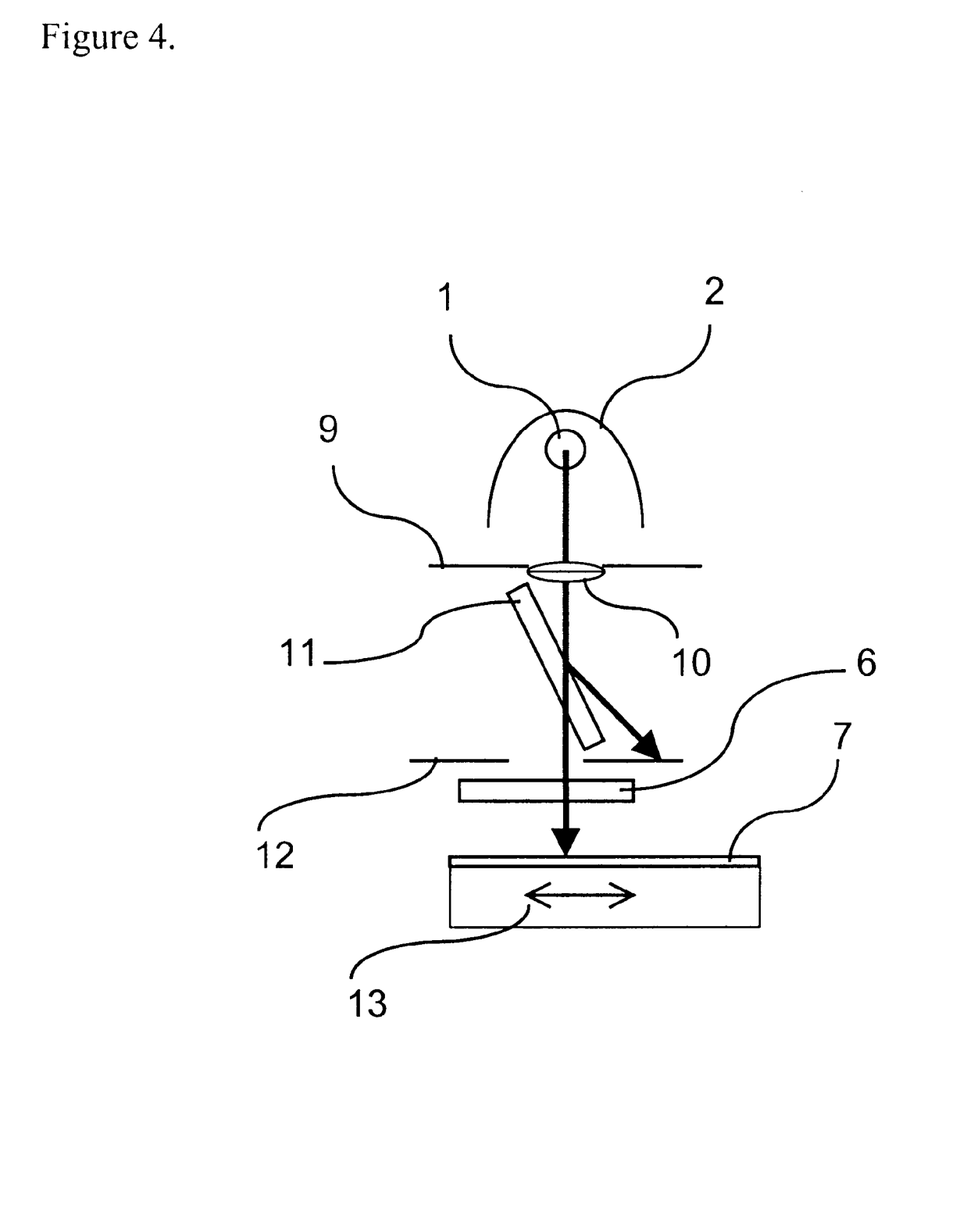
FIG. 4 illustrates a side view of an optical system utilizing refracting optics for exposure of a substrate at near normal incidence.

The optical exposure system of this example is depicted in FIG. 4. The lamp system (1 and 2) of Example 1 were combined with a first aperture 9 of 2"×2" which was placed near the focus of the lamp. Immediately following the aperture 9, two 2"×2" plano-convex fused silica cylindrical lenses 10 (Newport Optics, Irvine, Calif.) were placed in contact with each other to generate a line focal length of 80 mm. The line focus of the lenses was parallel to the linear axis of the gas filled lamp. This was followed by a single 4"×3" thin film polarizer 11 (CVI, Albuquerque, N.M.) at its design angle of 68 degrees. An aperture 12 of 1"×3" was placed after the polarizer. Aperture 9, cylindrical lenses 10, and aperture 12 served to collect and partially collimate the optical radiation to approximately a 10 degree divergence in the direction parallel to the scan.

Substrates with a photosensitive polyimide alignment layer were exposed by this system. A total exposure energy density of about 100 Joules/cm$^2$ was used. The scan speed and power of the lamp were chosen to give the desired energy density to sufficiently expose the optical alignment material on the substrates and cause the alignment of liquid crystal placed in contact with the alignment material.

The anisotropic dielectric properties were measured optically using a standard birefringence measurement system based on a photoelastic modulator (PEM-90, Hinds Instruments, Hillsboro, Ore.) according to methods outlined in by Kemp (Polarized Light and its Interaction with Modulating Devices, Hinds International, Inc., 1987). The optically induced birefringence was measured to be approximately $1\times10^{-2}$.

EXAMPLE 8

This example illustrates a vane structure used to control the degree of partial collimation in an optical system to expose a substrate for optical alignment.

An optical exposure system of this example is shown in FIG. 5 from a front view where the substrate is translated out of the page. It is comprised of the optical exposure system of FIG. 2 with a vane inserted between the cylindrical mirror 2 and the first aperture 3. A vane comprised of vertical shields 14 is placed to block light at an angle greater than 10 degrees with respect to vertical in a direction perpendicular to the scan direction. This limits the divergence of the light perpendicular to the scan direction to 20 degrees.

These examples and the foregoing description are illustrative of this invention. It is understood that those skilled in the art may devise alternatives to those discussed. The present invention is intended to embrace all such alternatives that fall within the scope of the claims.

What is claimed is:

1. An optical exposure system for aligning a substrate with partially polarized and partially collimated light comprising:
   at least one source of optical radiation;
   means for partially collimating said optical radiation;
   means for partially polarizing said optical radiation; and
   means for transporting the substrate relative to the partially collimated and polarized optical radiation.

2. An optical exposure system of claim 1 further comprising:
   means for partially filtering said optical radiation.

3. An optical exposure system of claim 2 wherein;
   said source has a long axis;
   the means for partially collimating and partially polarizing said optical radiation comprise:
   a cylindrical elliptical mirror with a long axis, located parallel to the long axis of the source and at a distance to focus the optical radiation at a focus point;
   a first aperture with a long axis and faces toward and away from the source, located at about the focus point and along the long axis of the source;
   a thin film polarizer with faces toward and away from the source and a specified design angle, located along the face of the first aperture away from the source and at an angle corresponding to the specified design angle, wherein the thin film polarizer generates a reflected ray and a transmitted ray;
   a second aperture with a long axis and faces toward and away from the source, located along the face of the thin film polarizer away from the source, along the long axis of the first aperture, and parallel to the first aperture;
   the means for partially filtering said optical radiation is a filter with faces toward and away from the source, located parallel and along the face of the second aperture away from the source;
   the means for transporting the substrate relative to the partially collimated and polarized optical radiation is a translation stage with a surface facing the source, for holding the substrate, located parallel and along the face of the filter away from the source.

4. An optical exposure system of claim 1 further comprising:
   means for directing a portion of the optical radiation at an oblique angle relative to the substrate.

5. An optical exposure system of claim 2 further comprising:
   means for directing a portion of the optical radiation at an oblique angle relative to the substrate.

6. An optical system of claim 3 further comprising:
   a reflecting mirror with a reflecting surface facing the source, located between the second aperture and the filter, in position to reflect the transmitted ray of the thin film polarizer onto the substrate to create an angle of incidence of the transmitted ray on the substrate.

7. An optical system of claim 4 wherein the means for directing a portion of the optical radiation at an oblique angle relative to the substrate is selected from at least one of the group consisting of a thin film polarizer operating in a reflective mode and a mirrored surface operating in a reflective mode.

8. An optical system of claim 5 wherein:
   the source of optical radiation is at least one linear gas-filled lamp having a long axis;
   the means for partially collimating said optical radiation is at least one reflector with cylindrical symmetry and at least one aperture;
   the means for partially polarizing said optical radiation is at least one thin film polarizer operating in a reflective mode;
   the means for partially filtering said optical radiation is selected from at least one of the group consisting of an absorbing glass and a dichroic thin film;

the means for directing a portion of said optical radiation at an oblique angle relative to said substrate is at least one thin film polarizer operating in reflective mode; and the means for transporting the substrate relative to the partially collimated and polarized optical radiation is at least one linear translation mechanism.

9. An optical system of claim 5 wherein:

the source of optical radiation is at least one linear gas-filled lamp with a long axis;

the means for partially collimating said optical radiation is at least one reflector with cylindrical symmetry and at least one aperture;

the means for partially polarizing said optical radiation is at least one thin film polarizer and at least one mirror wherein the transmitted optical radiation from said thin film polarizer is reflected off the aluminum mirror;

the means for partially filtering said optical radiation is selected from at least one of the group consisting of an absorbing glass and a dichroic thin film;

the means for directing a portion of said optical radiation at an oblique angle relative to said substrate is at least one mirror; and the means for transporting substrates and radiation relative to one another is at least one linear translation mechanism to support the substrate.

10. An optical exposure system of claim 2 further comprising:

a means to rotate the substrate about the normal to the substrate plane.

11. An optical exposure system of claim 4 further comprising:

a means to rotate the substrate about the normal to the substrate plane.

12. An optical exposure system of claim 5 further comprising:

a means to rotate the substrate about the normal to the substrate plane.

* * * * *